United States Patent [19]
Brassart et al.

[11] Patent Number: 5,972,415
[45] Date of Patent: Oct. 26, 1999

[54] NUTRITIVE COMPOSITION

[75] Inventors: Dominique Brassart, Bussigny; Véronique Jaussan, Morges; Thomas Schweizer, Le Mont-Sur-Lausanne, all of Switzerland; Thierry Brun, Saint Samson, France

[73] Assignee: Nestec S.A., Vevey, Switzerland

[21] Appl. No.: 09/086,130

[22] Filed: May 28, 1998

[30] Foreign Application Priority Data

Jun. 23, 1997 [EP] European Pat. Off. .............. 97201916

[51] Int. Cl.⁶ ........................................ A23L 1/20
[52] U.S. Cl. .................. 426/634; 426/578; 426/590; 426/601; 426/626; 426/629; 426/648; 426/656; 426/658; 426/661; 426/800
[58] Field of Search ..................... 426/634, 590, 426/626, 629, 648, 656, 658, 601, 661, 578, 800

[56] References Cited

U.S. PATENT DOCUMENTS 4,711,786  12/1987  Schmidt ................................. 426/634

FOREIGN PATENT DOCUMENTS

| 0 756 828 | 2/1997 | European Pat. Off. . |
| 2 673 360 | 9/1992 | France . |
| 94/12541 | 6/1994 | WIPO . |

*Primary Examiner*—Helen Pratt
*Attorney, Agent, or Firm*—Hill & Simpson

[57] ABSTRACT

Nutritive composition based on fibers comprising at least a mixture of pea internal fibers, pea external envelope fibers and inulin.

12 Claims, No Drawings

NUTRITIVE COMPOSITION

The subject of the present invention is a nutritive composition based on fibres.

According to a committee of American experts (Pilch S. M., Physiological effects and health consequences of dietary fiber—F.B.A, 223, 84, 2059 —Bethesda, Md. Federation of American Societies for Experimental Biol., 1987), in the daily food ration of healthy people, the quantity of dietary fibres should be of the order of 27 to 40 g.

Dietary fibres can be classified in particular according to their properties and their chemical and physical structures, according to their digestibility during the gastrointestinal transit or according to their physiological properties during the gastrointestinal transit.

Chemically, dietary fibres consist of polysaccharides or lignin. These compounds are not hydrolysed by the endogenous secretions during the gastrointestinal transit (T. Schweizer et al., The physiological and nutritional importance of dietary fibres, Exprientia, 44, p 182–186, 1991).

The constituent polysaccharides of these dietary fibres may be plant membrane polysaccharides, in particular cellulose, hemicellulose or pectin, or other intracellular polysaccharides which are not hydrolysed by the digestive enzymes, such as resistant starch, galactomannans or inulin (Quemener et al., Determination of inulins and oligofructoses in food products and integration in the AOAC methods for measurement of total dietary fibres, Lebensm. Wiss. u. Technol., 27, p 125–132, 1994).

Depending on their biological and physicochemical properties, dietary fibres are classified into two categories, insoluble fibres and soluble fibres.

The insoluble fibres, such as cellulose, maize fibres or insoluble soya fibres, have essentially a mechanical role. They are generally only very slightly fermented by the intestinal flora and contribute to reducing the duration of the intestinal transit (Scheppach et al., Addition of dietary fiber to liquid formula diets, JPEN, 14, p 202–209, 1990).

The soluble fibres, such as pectin, inulin or resistant starch, are a very good fermentation substrate for the intestinal flora. The product of this fermentation is a release of fatty acids, in particular short-chain fatty acids in the colon, which has the effect of reducing the pH value in the colon and of allowing control of the growth and development of pathogenic bacteria in the colon.

EP 0 591 267 describes a fibre system for nutritive products comprising, by mass, 5–50% of gum arabic, 5–25% of sodium carboxymethylcellulose and 45–80% of oat envelope fibres.

Moreover, the fact that the administration by the enteral route of a composition free of dietary fibres caused intestinal disorders such as diarrhoea or constipation in patients has been demonstrated (Palacio et al., Nutrition in clinical practice, 5, p 99–106, 1990).

Thus, EP 756 828 describes a composition based on dietary fibres, intended in particular for enteral nutrition, which makes it possible to contribute to maintaining good intestine function. This composition, which is in liquid form or in dried form, contains, per 2000 kcal, 15–50% of soluble dietary fibres of polysaccharides, 15–45% of insoluble dietary fibres of polysaccharides and 8–70% of oligosaccharides or of resistant starch. It may also contain carbohydrates and/or fat and/or protein material.

The object of the present invention is to provide a nutritive composition based on fibres having a good balance in the proportion of soluble fibres and of insoluble fibres, having an advantageous viscosity and good storage stability.

The composition according to the present invention is intended, furthermore, to act on the entire gastrointestinal system, at the level of the stomach, the small intestine and the colon.

To this effect, the nutritive composition based on fibres according to the present invention comprises at least a mixture of fibres consisting of pea internal fibres, pea external envelope fibres and inulin.

It was with surprise that it was observed that the composition according to the present invention, which has the advantage of being based on natural dietary fibres, has, on the one hand, good mechanical properties such as, in particular, a decrease in the duration of the gastrointestinal transit and, on the other hand, good nutritional and biological properties such as, in particular, the release of short-chain fatty acids, making it possible in particular to maintain a bacterial balance at the level of the intestinal mucosa and to avoid the growth and development of pathogenic bacteria.

The mixture of fibres according to the present invention may contain 20–50% of pea internal fibres, 20–40% of pea external envelope fibres and 20–60% of inulin.

The pea internal fibres are fibres consisting of 15% of cellulose, 45% of hemicellulose and 40% of pectin. The 66% which represents the insoluble fraction, pea internal fibres, has, on the one hand, a mechanical effect by acting on the duration of the gastrointestinal transit and, on the other hand, a nutritional and biological effect, since these fibres are fermented by the intestinal flora and allow the release of short-chain fatty acids. The release of these short-chain fatty acids causes a reduction in the value of the pH in the colon and, as a result, a decrease in the growth and development of the pathogenic strains in the colon. The release of fatty acids is of great importance on supplementation with antibiotics because, during an antibiotic treatment, the intestinal flora no longer fulfils its functions and a diet high in fibres, having a soluble fraction, makes it possible to overcome this problem. Moreover, the release of short-chain fatty acids, such as butyrate, causes the absorption of water coupled with absorption of sodium ions in the colon, which makes it possible to increase the antidiarrhoeal effect. Furthermore, butyrate is a high-energy substrate for the colonocytes.

The fibres of the pea external envelope are composed of 68% of cellulose, 25% of hemicellulose and 7% of lignin. They consist of a 10% soluble fraction and a 90% insoluble fraction. They have, on the one hand, an effect on the capacity to retain water in the intestine and, on the other hand, a mechanical effect during the gastrointestinal transit.

The inulin fibres are soluble fibres which are present in numerous plants, such as asparagus, artichokes, onions, wheat or chicory, for example. Inulin fibres are not digested in the small intestine. They are fermented in the colon. The main effects of inulin fibres on the digestive system are a decrease in the duration of the intestinal transit, a decrease in the level of glycemia, a decrease in the lipid content in the blood, a decrease in the pH in the colon, a decrease in the constipation phenomenon and a bifidogenic effect, for example. Thus, inulin fibres can be fermented by bifidobacteria, which has the consequence of increasing the concentration of these bacteria at the level of the intestinal flora and of decreasing the concentration of enterobacteria, in particular Clostridiae, at the level of the intestinal flora.

The composition according to the present invention may comprise 1–5% of a mixture of fibres, 15–30% of proteins, 40–65% of carbohydrates, 15–20% of lipids, 1–2% of vitamins and/or 0.3–5% of mineral salts, for example.

In the composition according to the present invention, inulin may be replaced by an oligosaccharide or a mix of oligosaccharides. Oligosaccharids may be galacto-oligosaccarides, fructo-oligosaccharides, xylo-oligosaccharides or an oligo derivative of starch, for example.

This composition may be intended for enteral nutrition, for example. It has a good balance between the soluble dietary fibres and the insoluble dietary fibres. Furthermore, this composition can be easily administered by the enteral route, either by gravity, with a regular flow rate adapted to good administration of nutrients, or by a pump system. Indeed, on the one hand, if the flow rate is too slow, the synergy of the food products constituting the composition intended for enteral nutrition is lost and, on the other hand, if the flow rate is too high, absorption and tolerance disorders are caused.

This composition, intended for enteral nutrition, may be a composition which comprises a mixture of fibres having a proportion of 45–55% of soluble fraction and 45–55% of insoluble fraction, for example. This proportion makes it possible to best exploit the advantages of each of these two fractions.

Furthermore, this composition, intended for enteral nutrition, may have a viscosity of less than 12 cp, for example. It is possible to measure the shearing force with the aid of a Rhéomate-type viscometer and thus calculate from this value the viscosity level, for example.

The nutritive composition according to the present invention is described in greater detail with the aid of the physicochemical data below and of the examples of application below.

Test 1: Physicochemical analysis of a nutritive composition based on pea internal fibres, on pea external envelope fibres and inulin A nutritive composition based on fibres according to the present invention is prepared.

To do this, 5 g/l of pea internal fibres, 5 g/l of pea external envelope fibres and 5 g/l of inulin are mixed in demineralized water at 65–70° C.

This mixture is dispersed for 5 min, it is passed through a colloid mill and then it is stored in a tank with stirring.

In parallel, a preemulsion is prepared by mixing 39 g/l of a lipid mixture with 1.4 g/l of an emulsifier, glycerol stearate.

This preemulsion is then mixed with the mixture of fibres. To do this, it is passed through the colloid mill.

An emulsion is thus obtained which is cooled to 60° C.

After this emulsification stage, 37.5 g/l of a protein mixture, 125 g/l of carbohydrates as well as 300 mg/l of a mixture of different mineral salts are added so as to produce a homogeneous preparation.

An aqueous solution of vitamins is prepared by mixing 2 g/l of vitamins in demineralized water at 25° C.

This aqueous solution of vitamins is added to the preparation.

A nutritive composition according to the present invention is obtained whose pH is adjusted to 7.1.

This nutritive composition is heat-treated at 150° C. for 6 sec. Next, it is stored at 6° C.

After storing for one month at room temperature, the particle size, the viscosity, the texture as well as the stability of the nutritive composition are measured. Furthermore, a taste evaluation of the nutritive composition is carried out.

All these measurements are mentioned in Table I below.

TABLE I

| Measurements | |
| --- | --- |
| Particle size | <50 µm |
| Viscosity (composition 1.5%) | 6 cp |
| Texture | creamy |
| Taste evaluation | neutral |
| Stability (measurement of the deposit after storing for one month at room temperature) | good |

The measurements mentioned in Table I thus demonstrate the fact that the composition according to the present invention has characteristics which are highly advantageous for its use in the field of enteral nutrition. Indeed, this composition, because of its low viscosity, allows a good use by gravity. Moreover, this composition has a very good stability. After storing for one month at room temperature, no presence of deposit is noted.

EXAMPLE 1

A nutritive composition according to the present invention, intended for enteral nutrition, is prepared.

To do this, a composition is prepared as described in test 1.

This composition is distributed, in a sterile environment, into 200-ml plastic pouches which are hermetically closed before being stored at 10° C.

The composition contained in these pouches is then administered to patients by the enteral route, by gravity. Because of its appropriate viscosity, this composition has a regular flow rate appropriate for good administration of the nutrients.

EXAMPLE 2

A dessert cream, enriched with fibres, is prepared.

To do this, a mixture of fibres consisting of 1.03 kg of pea internal fibres, 0.55 kg of pea external envelope fibres and 0.55 kg of inulin is introduced, with stirring, into 20 liters of demineralized water at 70° C., in a mixer. This mixture of fibres is left to become hydrated for about 5 min, with stirring. This mixture of fibres is then stored at room temperature.

A composition containing 10 liters of demineralized water at 70° C., 0.3 kg of glycerol stearate, 2.13 kg of butter oil and 5.95 kg of skimmed milk powder is then prepared in a mixer.

The composition is then ground in a colloid mill so as to produce a preemulsion.

Still with stirring, 5.95 kg of skimmed milk powder are mixed in 3 liters of demineralized water heated to 70° C. which are then incorporated into the preemulsion, to which the mixture of hydrated fibres has been added beforehand.

24 liters of demineralized water heated to 70° C. are added to the whole, with stirring, followed by 0.12 kg of carrageenan, 6.5 kg of sucrose, 0.65 kg of glucose syrup, 1.7 kg of modified starch, 6.25 kg of milk proteins, 76 g of magnesium chloride, 5.4 g of iron sulphate, 4 g of zinc sulphate, 55 g of β-carotene, 0.16 kg of vanilla flavour, 20 g of vitaminized mixture, 40 g of sodium ascorbate, 0.65 kg of dehydrated glucose syrup and 0.66 kg of disodium phosphate.

The dry extract is then recovered which is adjusted to 29 g per 100 g of demineralized water.

The product is then degassed at −500 mbar and it is sterilized in a tubular sterilizer, at 150° C. for 7 seconds. The dessert cream thus produced is then cooled to 17° C. and it is packaged in hermetically closed 125-g plastic pots.

EXAMPLE 3

An apple-based cereal bar, enriched with fibres, is prepared.

To do this, a mixture containing 200 g of soya lecithin, 3.7 kg of sunflower oil and 3.7 kg of soya oil is heated to 40° C.

A mixture, whose temperature is 90° C. and which contains 10.5 kg of oligofructose syrup, 9.6 kg of glucose syrup and 3 kg of fructose, is added to this mixture of oils.

The whole thus obtained is mixed to a temperature of 75° C.

There are then added 5.7 kg of milk proteins, 6.25 kg of pea internal fibres, 3 kg of inulin, 545 g of calcium carbonate, 1.5 kg of apple powder, 3 kg of dehydrated apples, 145.1 g of vitamins, 500 g of gelatin, 1.5 kg of apple flavour, 16 kg of a mixture of extruded proteins, 10 kg of soya beans and 5 kg of wheat germs.

This mixture is then compressed between two rotating grooved rollers so as to form a continuous band of product. This band is cooled by passing through a ventilated cooling tunnel and finally cut into individual bars 13 mm thick, 60 mm wide and 90 mm long.

Each bar is packaged in a hermetically closed packet.

We claim:

1. A nutritive composition based on fibres, comprising a mixture of fibres including pea internal fibres, pea external envelope fibres, and inulin.

2. The composition of claim 1 wherein the mixture of fibres contains approximately 20 to about 50% by weight pea internal fibres, approximately 20 to about 40% by weight pea external envelope fibres, and approximately 20 to about 60% by weight inulin.

3. The composition of claim 1 comprising at least approximately 1 to about 5% by weight of the mixture of fibres, approximately 15 to about 30% by weight proteins, approximately 40 to about 65% by weight carbohydrates, approximately 15 to about 20% by weight lipids, approximately 1 to about 2% by weight of vitamins, and approximately 0.3 to about 5% by weight mineral salts.

4. The composition of claim 1 wherein the composition can provide enteral nutrition.

5. The composition of claim 1 wherein the mixture of fibres comprises:

approximately 45 to about 55% by weight of a soluble fraction; and approximately 45 to about 55% by weight of an insoluble fraction.

6. The composition of claim 1 wherein the composition has a viscosity of less than 12 cps.

7. A nutritive composition comprising pea internal fibres, pea external envelope fibres and a component chosen from the group consisting of oligosacclaride, and/or a mixture of oligosaccharides.

8. The composition of claim 7 wherein the composition comprises approximately 20 to about 25% by weight pea internal fibres, approximately 20 to about 40% by weight pea external envelope fibres and approximately 20 to about 60% by weight of a component chosen from the group consisting of oligosaccharides and/or a mixture of oligosaccharides.

9. The composition of claim 7 wherein the composition includes approximately 1 to about 5% by weight of a mixture of fibres, approximately 15 to about 30% by weight proteins, approximately 40 to about 65% by weight carbohydrates, approximately 15 to about 20% by weight lipids, approximately 1 to about 2% of vitamins, and approximately 0.3 to about 5% by weight mineral salts.

10. The composition of claim 7 wherein the composition provides enteral nutrition.

11. The composition of claim 7 including a mixture of fibres that provides approximately 45 to about 55% by weight of a soluble fraction and approximately 45 to about 55% by weight of an insoluble fraction.

12. The composition of claim 7 wherein the composition has a viscosity of less than 12 cps.

* * * * *